July 17, 1951 — A. VAN DUYN — 2,560,670
SLICING MACHINE FOOD PUSHER
Filed May 10, 1947 — 5 Sheets-Sheet 1
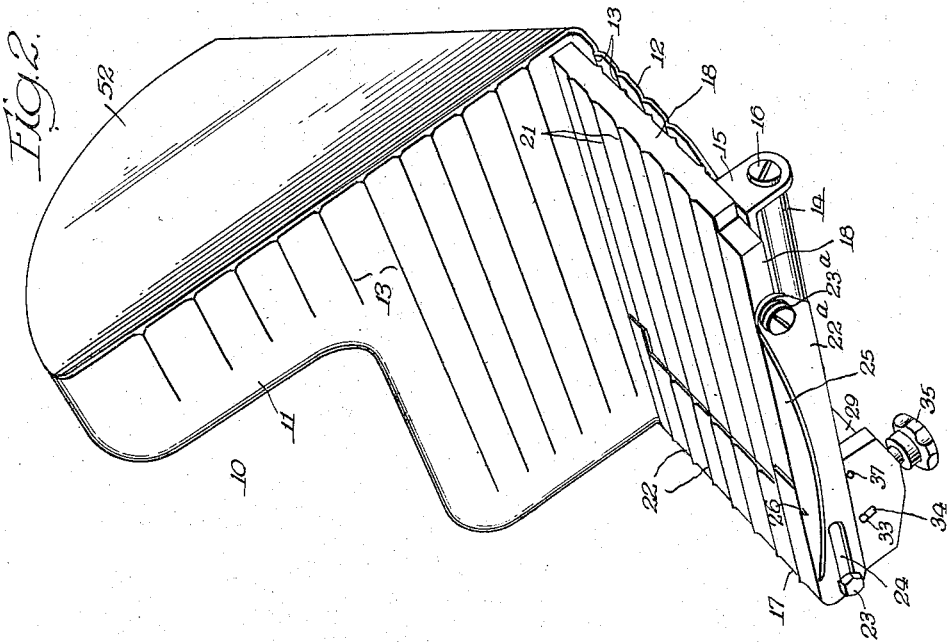
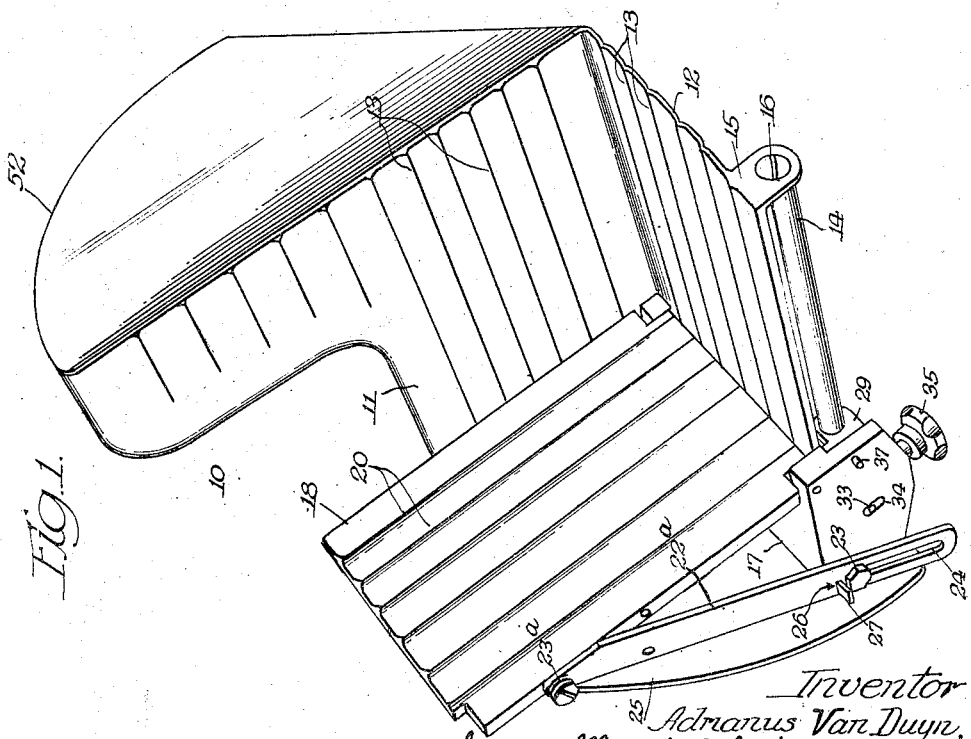
Inventor
Adrianus Van Duyn.
By Spencer, Marzall, Johnston & Cook, Attys

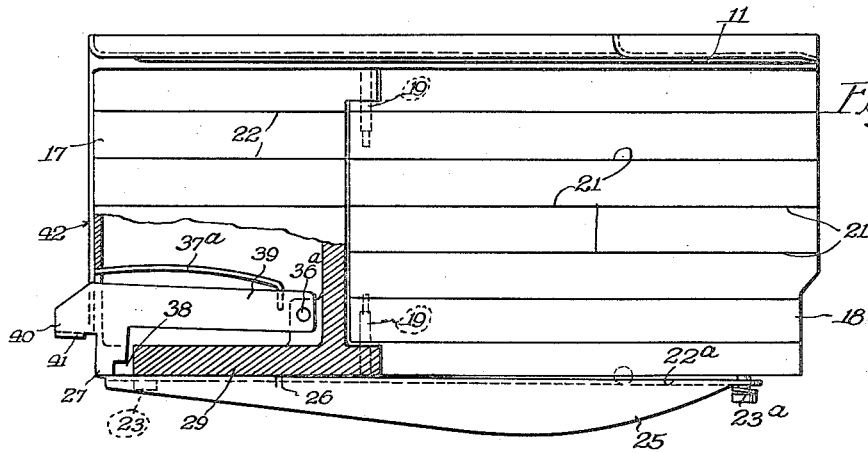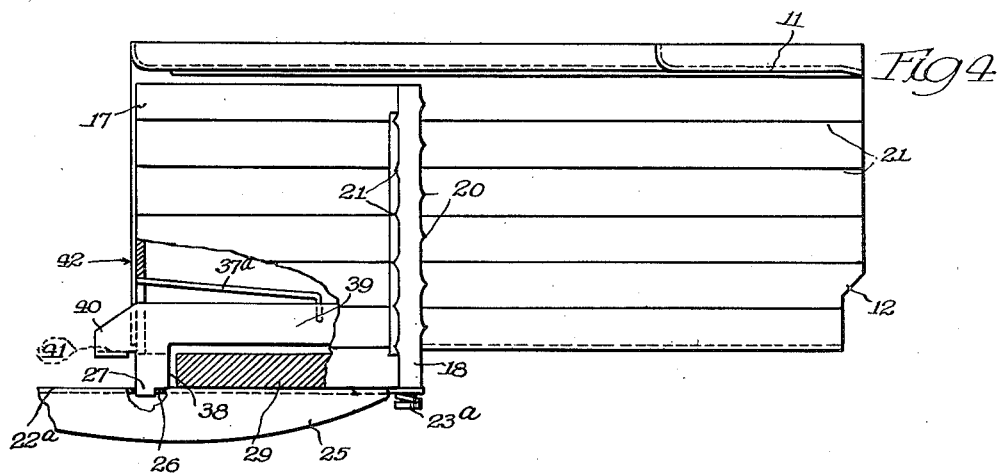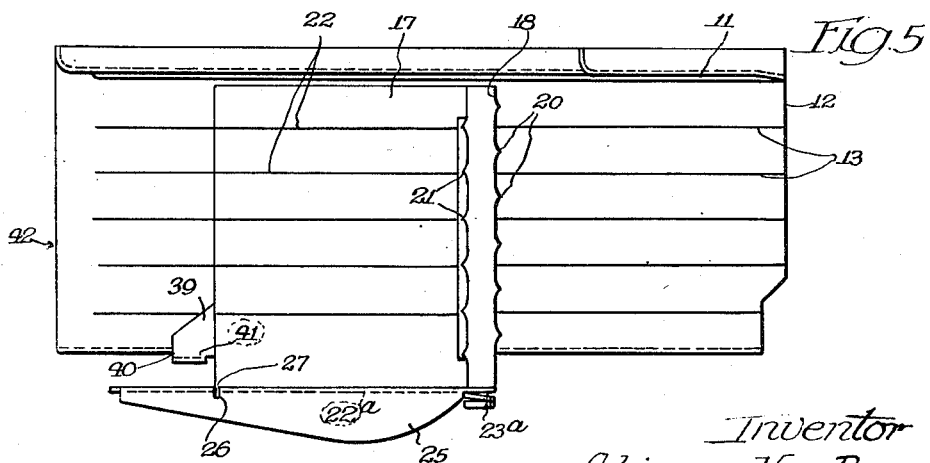

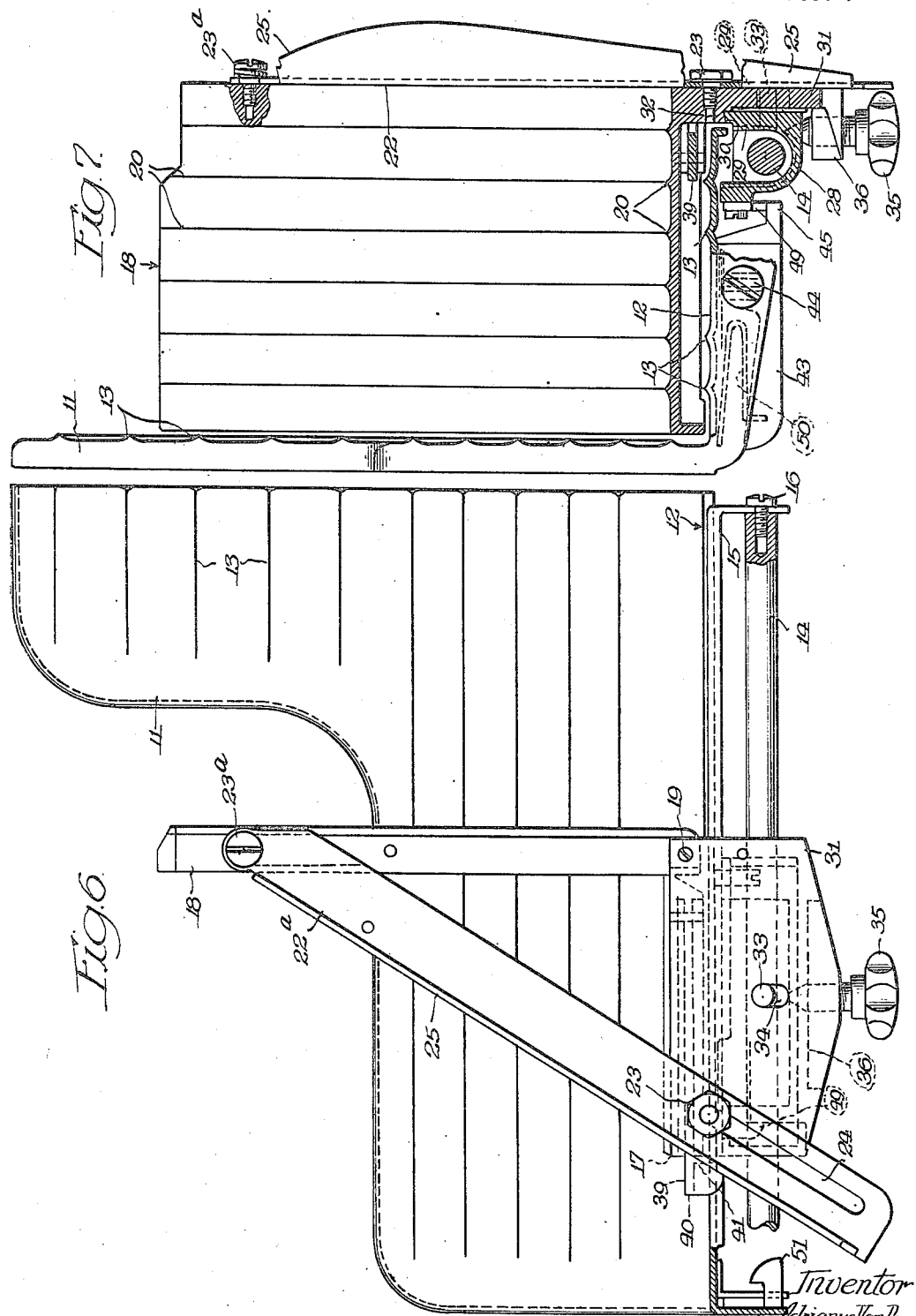

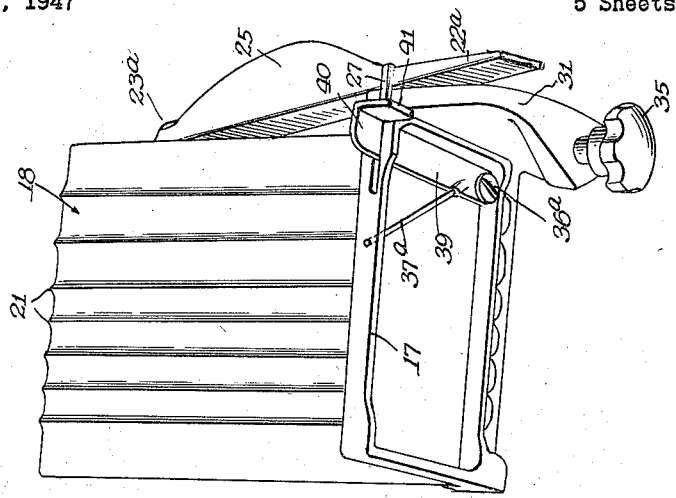
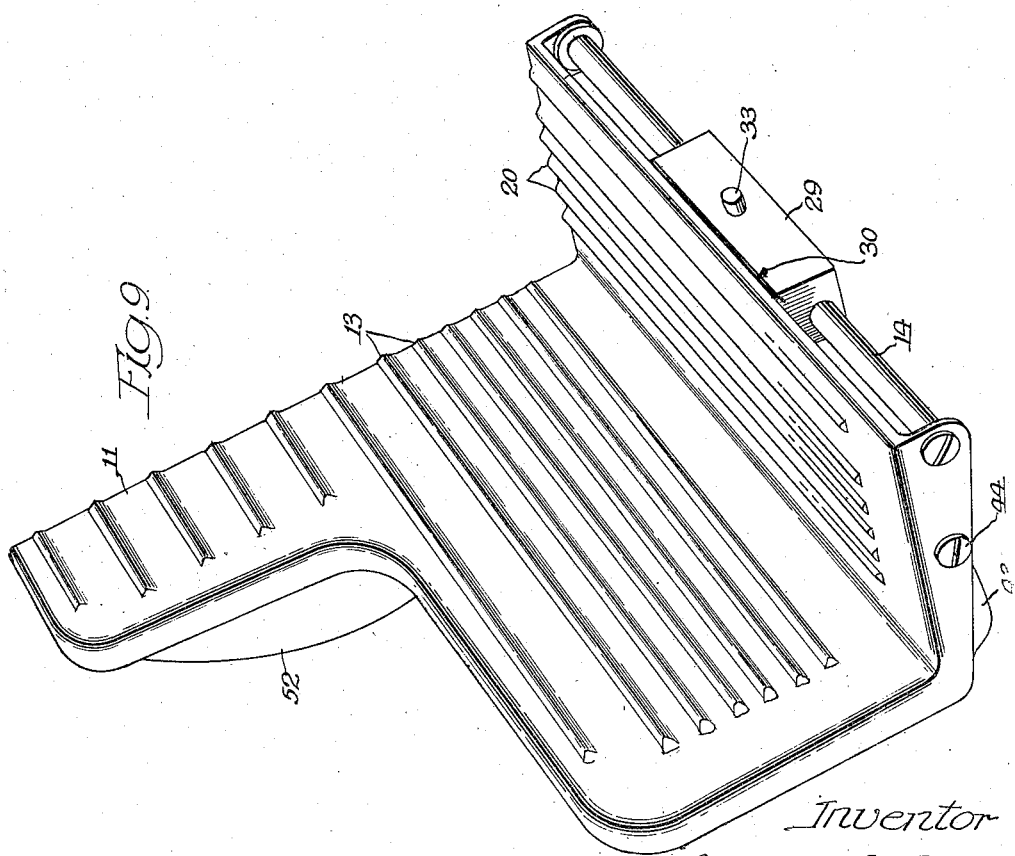

July 17, 1951 A. VAN DUYN 2,560,670
SLICING MACHINE FOOD PUSHER
Filed May 10, 1947 5 Sheets-Sheet 5
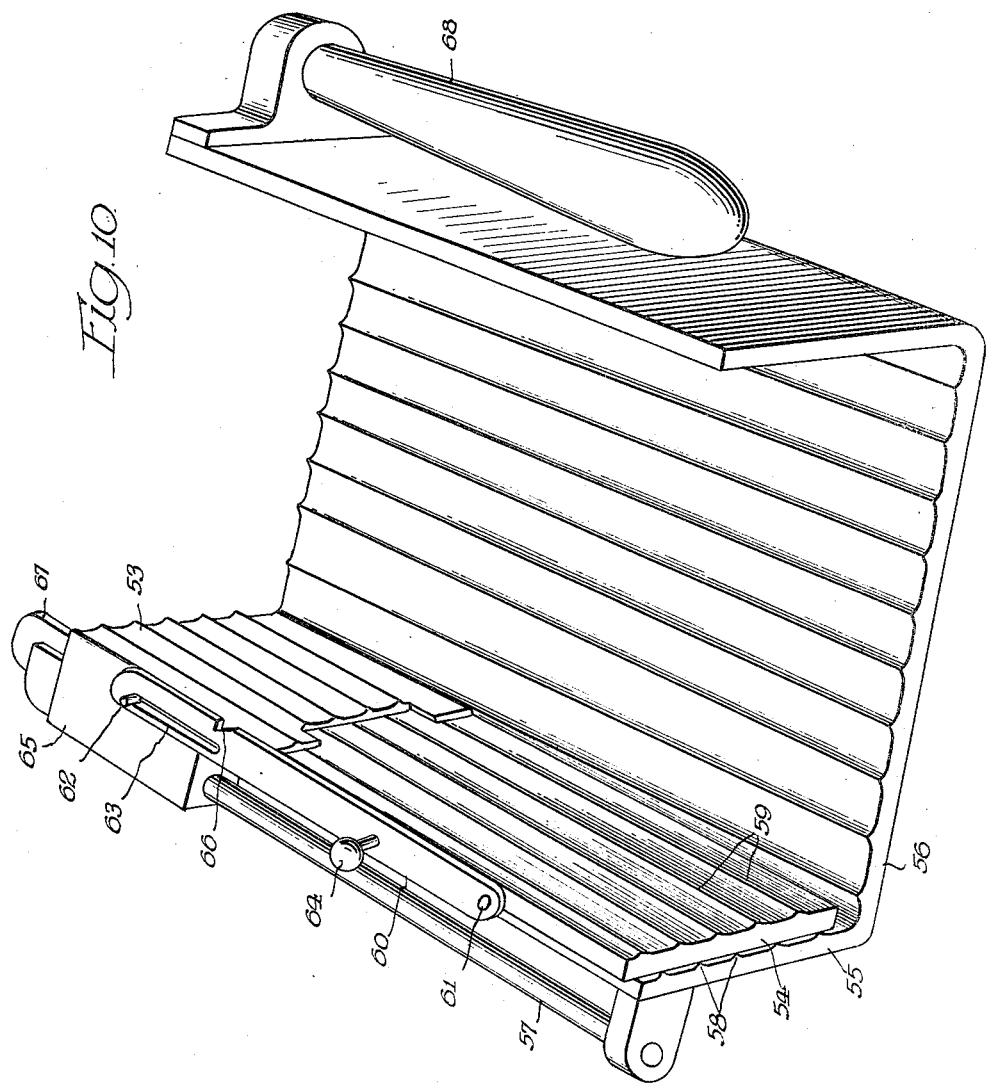
Inventor
Adrianus Van Duyn
By Spencer, Margall, Johnston & Cook,
Attys Patented July 17, 1951

2,560,670

UNITED STATES PATENT OFFICE 2,560,670

SLICING MACHINE FOOD PUSHER

Adrianus van Duyn, Hillegersberg, Rotterdam, Netherlands, assignor to U. S. Slicing Machine Company, Inc., La Porte, Ind., a corporation of Indiana Application May 10, 1947, Serial No. 747,237

14 Claims. (Cl. 146—102)

This invention relates, in general, to slicing machines for cutting meat and other edible substances into slices in succession. More specifically, the invention relates to a slicing machine substance carrier of the type having a surface against which the substance is supported when being fed across or relative thereto, step by step, to the knife of the machine, and one of the objects of the invention is to provide an improved pusher or feed plate for the substance, which may be disposed in different positions with respect to the surface across or over which the substance is fed.

Another object is to provide an improved device of this character, which may be disposed at an angle to the substance supporting surface, whereby to function as a pusher for advancing the substance to the cutting plane, or which may be positioned in a plane parallel with the carrier supporting surface, so that the pusher itself will serve as a supporting surface, over or relative to which the substance may be fed to the knife.

A further object is to provide an improved device of this character, which, when positioned to form a surface over which the substance is fed, will be out of the way, and will be compact with respect to the substance carrier.

A still further object is to provide improved means for maintaining the parts in their adjusted positions, and improved means for maintaining the pusher against movement with respect to the carrier, when the parts are in predetermined positions with respect to each other.

Still another object is to provide an improved device of this character, which may be readily applied to any slicing machine having a food pusher, and which device will be simple and durable in construction, and effective and efficient in operation.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings illustrating this invention, in which Fig. 1 is a perspective view of the assembly, in which the substance engager or pusher is shown in its upright position.

Fig. 2 is a perspective view of the assembly, showing the pusher in a folded or stowed position.

Figs. 3, 4 and 5 are top plan views, partially broken away, of the assembly, with the food engager or pusher in stowed and upright positions.

Fig. 6 is a front elevation of the assembly, showing the holding and locking means for the several parts.

Fig. 7 is a top plan view of Fig. 6, partly in elevation, partly in section, and with parts broken away.

Fig. 8 is a perspective view of the pusher, detached from its support.

Fig. 9 is a perspective view of the substance carrier and the sliding support for the pusher.

Fig. 10 is a perspective view of a modified form of the invention, with the pusher in a folded or stowed position with respect to the substance carrier.

Referring more particularly to the drawings, the numeral 10 designates an open-ended, trough-like substance carrier, preferably of an L form in cross-section, comprising a side wall 11, and a floor or base 12. The walls may be provided with ribs 13, and a guide bar 14 extends along the side of the carrier floor 12, opposite to the wall 11, and is preferably secured in position at its ends, by brackets 15 below the floor, and maintained removably in position by screws 16.

A substance engager and pusher is slidably mounted upon the floor or base 12, and is formed of two sections 17, 18, the section 17 being guided upon the rod 14, and the section 18 being hingedly connected to the rear section 17, as at 19 (Fig. 6). The sections are of a size with respect to each other that when the rear section 17 is in its rearmost position with respect to the floor or base 12, the front section 18 may be moved into the position shown in Fig. 2, so as to be flat upon the floor or base 12, to itself provide a substance supporting surface.

When in this position, the sections 17 and 18 forming the pusher element will be substantially co-extensive with the base or floor 12. The section 18 may be provided with ribs 20 on its front face, and with similar ribs 21 on its rear face, while the section 17 may be provided with ribs 22 on its upper face, so that when the section 18 is in the position shown in Fig. 2, to form a substance support, the substance will engage and rest upon the ribs 21 on the section 18, and upon the ribs 22 on the section 17.

When the parts are in the position shown in Fig. 1, the substance will rest upon the base or floor 12, and against the face of the section 18, and also against the wall 13, to be moved across the base or floor 12 by advancing the pusher element so that it will slide along the guide bar 14, and over the floor or base 12. When the section 18 is folded into the position shown in Fig. 2, the upper rear face of the section 18 having the ribs 21, and the upper surface of the section 17, form a support for the substance, across which the substance may be moved toward the cutting plane. If desired, the section 18 may be provided with spikes or prongs (not shown) for holding the substance when the section is positioned as a pusher element.

A link 22a is pivotally connected at one end, as at 23a, to the section 18, and has slidable connection with the section 17, preferably by a pin and slot connection 23—24. A wing or flange 25 may be provided on the link, by means of which the link may be actuated, and the section 18 raised and lowered with respect to the section 17. The link is provided with an open notch or recess 26, which is engageable by a catch or locking element 27, for holding the section 18 in its raised position, as shown in Fig. 1.

The section 17 of the pusher member is of a sectional construction embodying a slide or body member 28 (Fig. 7), which is slidable on the bar 14, and is provided with a front wall 29, the upper edge of which is preferably beveled or inclined, as at 30. The section 31 has an undercut portion, the upper wall 32 of which portion is also undercut, and engages and rests upon the beveled edge 30 of the section 29.

A pin or projection 33 extends into a slot 34 in the section 31, to assist in positioning these parts. A fastening means, such as a screw 35, passes through an extension 36 on the part 31, and engages the part 29, and co-operates with the shoulder 32 for binding these parts together. A stop 37 may be provided on the portion 31, for the link 22a.

The part 31, with the elements supported thereby, may be readily separated from the part 29 for cleaning purposes, by removing the screw 35. The catch or locking element 27 is carried by the portion or slide 29 of the section 17 of the pusher, and is pivotally supported, as at 36a (Fig. 3), to move about an upright pivot. A spring 37a tends normally to project the catch through an opening 38 in the member 29, so that when the pusher section 18 is raised about its pivot 19, the catch will snap into the notch or recess 26, when the latter is in alinement with the catch, or in the position shown in Fig. 1.

The catch has a body portion 39, which projects beyond the rear of the section 17 of the pusher, to form a hand-engaging portion 40, having a shoulder 41 (Figs. 3 to 6) to engage behind the rear edge 42 of the base or bottom of the substance carrier, to lock the pusher against movement across the base of the carrier, when the section 18 of the pusher is moved into a plane coinciding with the plane of the section 17, as shown clearly in Fig. 3.

To permit the section 18 to be lowered from the position shown in Fig. 6, the catch is moved against the stress of the spring 37a, by grasping the hand-engaging portion 40, to move the end of the catch 27 out of the slot or recess 26 in the link 22a. The catch can then be released, and the link will, as it is folded, hold the catch 27 back, and will move the shoulder 41 behind the rear edge 24 of the section 17, and will hold the catch in this position against the stress of the spring 37a. The parts will remain in this position until the section 18 of the pusher is raised from the position shown in Fig. 3, or until the notch or recess 26 assumes a position in alinement with the portion 27 of the catch, when the catch will snap into the notch 26. This will occur when the section 18 assumes the position shown in Fig. 6, or is in a position to act as a pusher to push the substance into the cutting plane. During this last said movement, and when the catch springs into the notch or recess 26, the shoulder 41 will pass from behind the rear edge of the base or bottom of the substance carrier, thereby permitting the pusher to be moved with respect to, and across, the substance carrier.

Means are also provided for locking the pusher in its rearmost position, and against movement across the substance carrier when the section 18 of the pusher is locked in an upright position, so as to permit positioning of the substance between the pusher and the slice gauge plate (the latter not shown). This means embodies a lever 43 (Fig. 7), pivotally mounted between its ends, as at 44, upon the base or floor 12 of the carrier, and is formed at one end with a hook or nose 49 (Fig. 6). The other end of the lever is shaped to provide a hand-engaging portion, a spring 50 being provided to cause the hand-engaging portion to be positioned to be depressed against the stress of the spring. Another hook-shaped portion or shoulder 51 is provided, which is connected to the sliding body portion 29 of the section 17 of the pusher element.

When the pusher section 17 is moved to the rear, and the spring pressed nose or hook-shaped portion 49, that is connected to the slide block 29, engages the hook-shaped portion or shoulder 51, the pusher will be locked in its rearmost position. By pressing the lever 43 against the stress of the spring 50, the nose or shoulder 49 will become released from the hook or shoulder 51, and the pusher will be released so that it can be moved across the base or bottom 12 of the substance carrier. This releasing may be effected when the section 18 is locked in its elevated or vertical position by the catch 27 and notch 26, in the link 22a, thus maintaining the section 18 in its raised position, and preventing it from being lowered.

A wall or shield 52 (Figs. 1 and 2) may be provided and attached to the side wall 11 of the carrier, as a protective shield for the operator's hands.

In the form of the invention shown in Fig. 10, the pusher sections 53, 54 are shown as being associated with one of the side walls 55 of a substance carrier 56, and the guide bar 57 is arranged along the top of the wall. The pusher, when in the position shown in this figure, rests against the ribs 58 of the wall, and the ribs 59 will be outermost. When the section 54 is to be used to push the substance, it is moved laterally with respect to the wall 55. This section is held in its adjusted position by means of a link 60, pivoted, as at 61, to the section 54, and connected to the section 53 by means of a pin and slot 62—63, a handle 64 being provided for actuating the link.

The sliding support 65 is similar to the support for the section 29, in the form of the invention shown in Figs. 1 and 2, and a recess or notch 66 is provided for a locking catch, similar to the catch 27. A hook 67 is connected to the section 53, and is adapted to engage behind the rear edge of the bottom of the substance carrier wall 55, to lock the pusher in its rearmost position, and against movement with respect to the carrier wall 55. This form of carrier is of a trough shape, and is provided with a handle 68, by means of which it may be advanced in a plane parallel with the cutting plane.

This invention is applicable to slicing machines in general. That is to say, the carrier may be part of a reciprocable carriage, or it may be a fixture on the machine frame. However, the carrier may be set at an inclination, as in the so-called gravity-feed machines, or it may be set horizontally. In the former case, the substance pusher is fed by gravity, while in the latter case it may be fed manually.

While the preferred forms of the invention have been herein shown and described, it is to be understood that various changes may be made in the details of construction, and in the combination and arrangement of the several parts, within the scope of the claims, without departing from the spirit of this invention.

What is claimed as new is:

1. A slicing machine substance support movable in a plane parallel with the cutting plane, a substance pusher movable with and also across the support toward the cutting plane, said pusher embodying two sections, means slidably connecting one of said sections to the support, and pivot means extending normal to the support pivotally connecting one end of the other of said sections to the adjacent end of said one section whereby said other section may be positioned either at an angle to the first said section and to the said support, to push the substance towards the cutting plane, or in a plane parallel with the said support, to itself form a substance support.

2. A slicing machine substance support movable in a plane parallel with the cutting plane, a substance pusher movable with and also across the support toward the cutting plane, said pusher embodying two sections, means slidably connecting one of said sections to the support, means pivotally connecting the other of said sections to said one section whereby said other section may be positioned either at an angle to the first said section and to the said support, to push the substance towards the cutting plane, or in a plane parallel with the said support, to itself form a substance support, and means for locking the said other section in its angularly adjusted position.

3. A slicing machine substance support movable in a plane parallel with the cutting plane, a substance pusher movable with and also across the support toward the cutting plane, said pusher embodying two sections, means slidably connecting one of said sections to the support, means pivotally connecting the other of said sections to said one section whereby said other section may be positioned either at an angle to the first said section and to the said support, to push the substance towards the cutting plane, or in a plane parallel with the said support, to itself form a substance support, and means for locking said pusher against movement with respect to the said support when said pusher is in a plane parallel therewith.

4. A slicing machine substance support movable in a plane parallel with the cutting plane, a substance pusher movable with and also across the support towards the cutting plane, said pusher embodying two sections hingedly connected together, means slidably connecting one of the sections to the support, the hinge connection enabling the other section to be positioned at an angle to the first section, to push the substance across the said support, and also to be positioned in substantially the same plane as the first section, whereby to form a substance support, a link connection between said sections, and means cooperating with said link to lock the said other section in its angular position.

5. A slicing machine substance support movable in a plane parallel with the cutting plane, a substance pusher movable with and also across the support towards the cutting plane, said pusher embodying two sections hingedly connected together, means slidably connecting one of the sections to the support, the hinge connection enabling the other section to be positioned at an angle to the first section, to push the substance across the said support, and also to be positioned in substantially the same plane as the first section, whereby to form a substance support, a link connection between said sections, and locking means for maintaining said other section in its angularly adjusted position, a portion of said locking means also operating to lock the substance pusher against movement across said support, when the pusher is in a predetermined position with respect to the support.

6. A slicing machine substance support movable in a plane parallel with the cutting plane, a substance pusher movable with and also across the substance support toward the cutting plane, said pusher embodying two sections hingedly connected together, means slidably mounting one of the sections upon the support, the hinge connection enabling the other section to be positioned at an angle to the first section, to push the substance across the said support, and also to be positioned in substantially the same plane as the first section, whereby to form a substance support, a link connection between said sections, locking means for maintaining the said other section in its angularly adjusted position, and means for locking the substance pusher against movement across said support.

7. A slicing machine substance support movable in a plane parallel to the cutting plane, a substance pusher, means mounting said pusher for movement with and also across the said support, other mounting means swivelably mounting said pusher on said support whereby said pusher may be positioned either at an angle to said support to advance the substance with respect to the support, or a plane substantially parallel with said support, whereby to itself serve as a substance supporting member, yieldable locking means for locking the pusher against movement across the support, means on said pusher to urge said locking means to active position when said pusher has assumed said latter position with respect to the said support, and other locking means for locking said pusher at an angle to said support, one of the said locking means being rendered inactive when the other is rendered active.

8. A substance support for a slicing machine, a substance pusher member, said pusher embodying two sections hingedly connected together, a slide mounted upon said support, means detachably connecting one of the pusher sections to said slide, the hinge connection between said pusher sections enabling the other of said sections to be selectively positioned in the same plane as the first said section, to form a substance support, or at an angle thereto to form a pusher to push the substance across said support, and means for maintaining said other section in its angularly adjusted position.

9. A substance support for a slicing machine, a substance pusher member, said pusher embodying two sections hingedly connected together, a slide mounted upon said support, means detachably connecting one of the pusher sections to said slide, the hinge connection between said pusher sections enabling the other of said sections to be selectively positioned in the same plane as the first said section, to form a substance support, or at an angle thereto to form a pusher to push the substance across said support, means for maintaining said other section in its angularly adjusted position, and means for locking said pusher against movement across the substance support when the two sections of the pusher are disposed in substantially the same plane.

10. A substance support for a slicing machine, a substance pusher mounted for sliding movement across said support, said pusher embodying two sections hingedly connected together, whereby one section may be selectively positioned at an angle to the other section or in the same plane therewith, means for maintaining the sections at an angle, one with respect to the other, said means embodying a movable catch, a link connection between the sections and with which link said catch co-operates to lock the sections, and locking means connected to the catch and movable therewith for locking the pusher with respect to the substance support when one section of the pusher is at an angle to the other section, said link being in contact with said catch and operable to move said catch and locking means to render said locking means active when said catch is rendered inactive.

11. A substance support for a slicing machine, a substance pusher, said pusher embodying two sections pivotally connected together, means slidably mounting one of said sections upon said support, the other section being adapted to be positioned at an angle to said one section, means for locking the sections in such angular position, whereby to push the substance across the support, means for locking the pusher against movement across the support when the sections of the pusher are thus relatively adjusted, said sections being adapted to be positioned in substantially the same plane, whereby the pusher will form a substance support, and additional means for locking the pusher against movement across the substance support when the pusher sections are disposed in substantially the same plane.

12. A substance support for a slicing machine, a substance pusher embodying two joined sections, means slidably mounting one of said sections upon said support, a link pivotally connected to one of said sections and having slidable connection with the other section, there being a recess in said link, a yieldable catch on the slidably mounted section normally urging said catch against said link, means tending normally to urge said catch into said recess when the latter is adjacent the catch, said link, when the recess is not adjacent the catch, operating to hold the catch retracted, and a shoulder on the catch positioned adjacent the rear edge of said support, said shoulder being positioned and maintained behind an edge of the said support when the catch is thus retracted, for locking the said pusher against bodily movement with respect to said support.

13. A substance support for a slicing machine, a substance pusher embodying two joined sections, means slidably mounting one of said sections upon said support, a link pivotally connected to one of said sections and having slidable connection with the other section, there being a recess in said link, a yieldable catch on the slidably mounted section normally urging said catch against said link, means tending normally to urge said catch into said recess when the latter is adjacent the catch, said link, when the recess is not adjacent the catch, operating to hold the catch retracted, and a shoulder on the catch positioned adjacent the rear edge of said support, said shoulder being positioned and maintained behind an edge of the said support when the catch is thus retracted, for locking the said pusher against bodily movement with respect to said support, said catch and said shoulder operating in opposition to each other.

14. A substance support for a slicing machine, a guide carried by the support, a slide movable along said guide, a substance pusher embodying two members pivotally connected together, means detachably connecting one of said members to said slide for movement therewith, a link pivotally connected to one of said members and having slidable connection with the other member, there being a recess in said link, a catch movably mounted on the member connected to the slide, means tending normally to urge said catch against said link and into said recess when the latter is adjacent the catch, said link, when the recess is not adjacent the catch, operating to hold the catch retracted, and a shoulder on the catch positioned adjacent the rear edge of said support, said shoulder being positioned and maintained behind an edge of the said support when the catch is thus retracted, for locking the said pusher and slide against bodily movement with respect to said support.

ADRIANUS van DUYN.

REFERENCES CITED

The following references are of record in the file of this patent:

UNITED STATES PATENTS

| Number | Name | Date |
|---|---|---|
| 586,403 | Turner | July 13, 1897 |
| 1,015,859 | Walker et al. | Jan. 30, 1912 |
| 1,835,276 | Campbell | Dec. 8, 1931 |
| 2,004,602 | Folk | June 11, 1935 |
| 2,065,352 | Streckfuss | Dec. 22, 1936 |
| 2,237,047 | Brookhart et al. | Apr. 1, 1941 |
| 2,404,557 | Wood | July 23, 1946 |